United States Patent
Kehler et al.

(10) Patent No.: US 10,321,203 B2
(45) Date of Patent: Jun. 11, 2019

(54) PERSONALIZED CONTENT RANKING USING CONTENT RECEIVED FROM DIFFERENT SOURCES IN A VIDEO DELIVERY SYSTEM

(71) Applicant: HULU, LLC, Santa Monica, CA (US)

(72) Inventors: Christopher Russell Kehler, Santa Monica, CA (US); Kang Kang, Santa Monica, CA (US); Jeff Beal, Santa Monica, CA (US); Chi Zhang, Beijing (CN); Zhebang Hua, Beijing (CN); Lutfi Ilke Kaya, Santa Monica, CA (US)

(73) Assignee: HULU, LLC, Santa Monica, CA (US)

( * ) Notice: Subject to any disclaimer, the term of this patent is extended or adjusted under 35 U.S.C. 154(b) by 0 days.

(21) Appl. No.: 15/594,121

(22) Filed: May 12, 2017

(65) Prior Publication Data
US 2017/0332150 A1    Nov. 16, 2017

Related U.S. Application Data

(60) Provisional application No. 62/336,313, filed on May 13, 2016.

(51) Int. Cl.
| | |
|---|---|
| *H04N 21/81* | (2011.01) |
| *G06Q 30/02* | (2012.01) |
| *H04N 21/2668* | (2011.01) |
| *H04N 21/45* | (2011.01) |

(Continued)

(52) U.S. Cl.
CPC ....... *H04N 21/812* (2013.01); *G06Q 30/0254* (2013.01); *H04N 21/251* (2013.01);
(Continued)

(58) Field of Classification Search
CPC ........... G06Q 30/0254; G06Q 30/0269; G06Q 30/0255; G06Q 30/0271; G06Q 30/0251;
(Continued)

(56) References Cited

U.S. PATENT DOCUMENTS

| | | | |
|---|---|---|---|
| 6,286,005 B1 * | 9/2001 | Cannon | G06Q 30/02 455/2.01 |
| 8,661,029 B1 | 2/2014 | Kim et al. | |

(Continued)

FOREIGN PATENT DOCUMENTS

WO    2007/001247 A2    1/2007

OTHER PUBLICATIONS

International Search Report & Written Opinion for PCT Application PCT/US2017/032532 dated Aug. 21, 2017, 13 pages.

*Primary Examiner* — Nathan J Flynn
*Assistant Examiner* — Cynthia M Fogg
(74) *Attorney, Agent, or Firm* — Foutainhead Law Group P.C.

(57) ABSTRACT

A video delivery service may display different content on an interface, such as ad campaign content, media program campaign content, and recommendation content. For example, the video delivery service may communicate with an ad engine to determine ad campaign content that is available and ad campaign scores to rate the ad campaign content. The video delivery service may also communicate with a media program campaign engine to determine any media program campaign content for the user and media program campaign scores to rate the media program campaign content. Then, the video delivery service may communicate with a recommendation engine to rate the relevance of the ad campaign content or media program campaign content to the user. After receiving the ad campaign content, media program campaign content, and recommendation content, the video delivery service determines which of the ad campaign content, media program campaign content, and recommendation content to display in the interface.

21 Claims, 10 Drawing Sheets

600 ⟶

| | Content | Ad score | MP score | Rel. score | Total score |
|---|---|---|---|---|---|
| | 602-1 | 602-2 | 602-3 | 602-4 | 602-5 |
| 604-1 | Logo #1/ MP #1 | 900 | 700 | 60 | xxx |
| 604-2 | Logo #1/ MP #2 | 0 | 700 | 50 | 750 |
| 604-3 | Logo #1/ MP #3 | 0 | -300 | 70 | -230 |
| 604-4 | Logo #2/ MP #1 | 600 | 0 | 30 | 630 |
| 604-5 | Logo #2/ MP #2 | 800 | 400 | 70 | 1270 |
| 604-6 | MP #1 | 0 | 0 | 70 | 70 |
| 604-7 | Recommended content #1 | 0 | 800 | 50 | 850 |

(51) Int. Cl.
  *H04N 21/466* (2011.01)
  *H04N 21/25* (2011.01)
  *H04N 21/266* (2011.01)
  *H04N 21/2665* (2011.01)

(52) U.S. Cl.
  CPC ..... *H04N 21/2665* (2013.01); *H04N 21/2668* (2013.01); *H04N 21/26603* (2013.01); *H04N 21/4532* (2013.01); *H04N 21/4667* (2013.01); *H04N 21/4668* (2013.01)

(58) Field of Classification Search
  CPC ............. H04N 21/2668; H04N 21/251; H04N 21/26603; H04N 21/2665; H04N 21/4532; H04N 21/4667; H04N 21/4668; H04N 21/812; H04N 21/25883; H04N 21/44222; H04N 21/26258; H04N 21/4755
  USPC .......................................................... 725/42
  See application file for complete search history.

(56) References Cited

U.S. PATENT DOCUMENTS

| | | | |
|---|---|---|---|
| 2003/0070169 A1* | 4/2003 | Beyers, II | H04N 7/17318 725/51 |
| 2004/0019632 A1* | 1/2004 | McGee | G06F 17/30884 709/203 |
| 2008/0201324 A1* | 8/2008 | Aronowich | G06F 17/30864 |
| 2009/0030785 A1* | 1/2009 | Goyal | G06Q 30/00 705/14.1 |
| 2010/0154001 A1* | 6/2010 | Ellis | H04N 5/44543 725/44 |
| 2010/0162172 A1* | 6/2010 | Aroner | G06F 17/30029 715/838 |
| 2010/0242060 A1* | 9/2010 | Liu | G06Q 30/02 725/9 |
| 2015/0269167 A1 | 9/2015 | Tseng | |
| 2015/0312633 A1* | 10/2015 | Masciarotte | G06Q 30/0255 725/32 |

* cited by examiner

PERSONALIZED CONTENT RANKING USING CONTENT RECEIVED FROM DIFFERENT SOURCES IN A VIDEO DELIVERY SYSTEM

CROSS REFERENCE TO RELATED APPLICATIONS

The present disclosure claims priority to U.S. Provisional App. No. 62/336,313, entitled "Personalized Content Ranking Using Content Received from Different Sources in a Video Delivery System", filed May 13, 2016, the contents of which is incorporated herein by reference in their entirety.

BACKGROUND

Video delivery services provide a user interface to a user to allow the user to select videos to view, which may be provided on-demand or live. The video delivery service may also want to sell display content in areas of the user interface. In one example, the video delivery service may reserve certain portions of the interface to display the display content. Then, when different users view their own user interfaces, the different users typically see the same display content in the same portion of the interface.

DETAILED DESCRIPTION

Figure 1A:
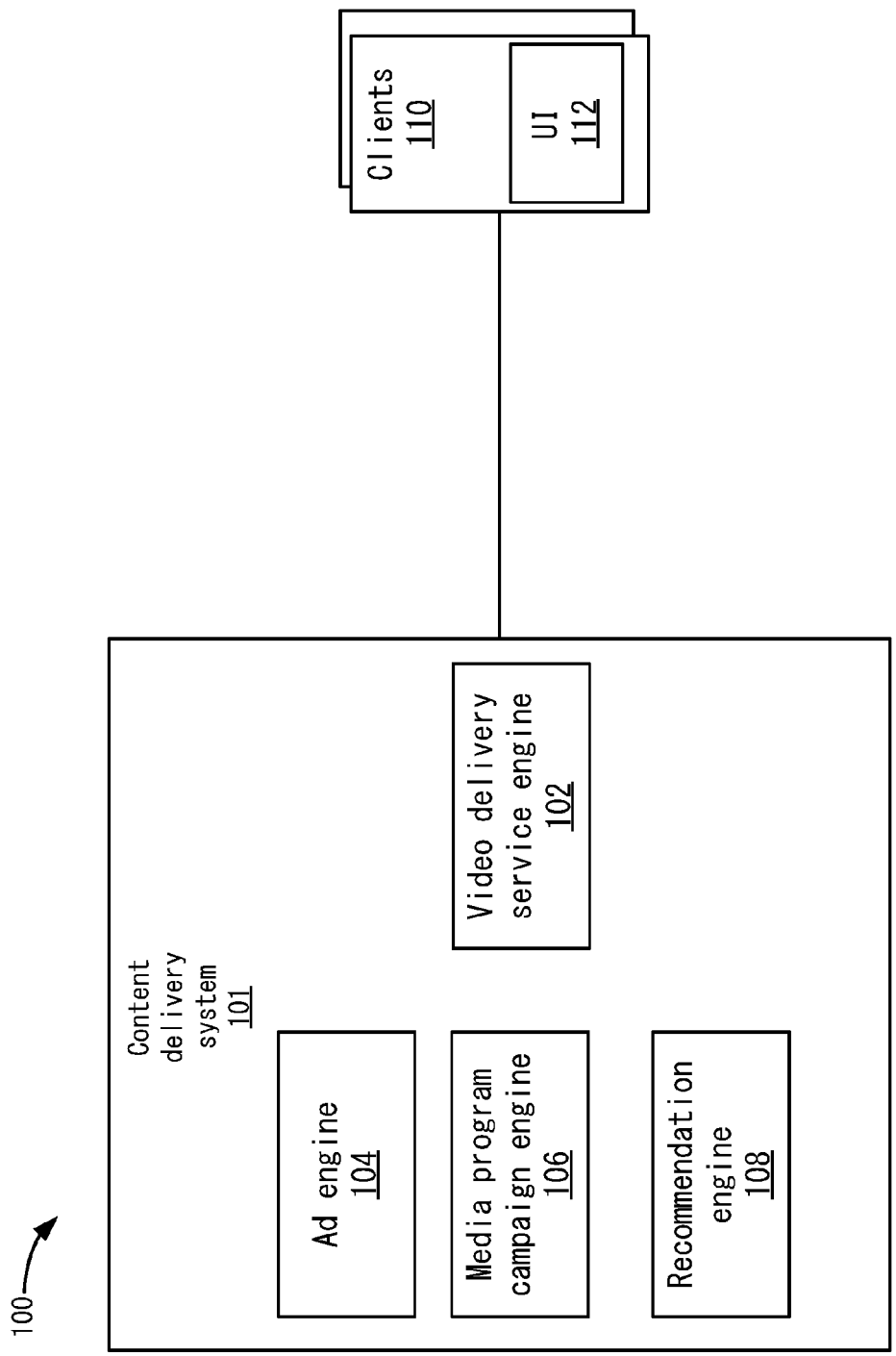
FIG. 1A depicts a simplified system of a content delivery system according to one embodiment.

Described herein are techniques for a content ranking system. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Particular embodiments personalize areas of a user interface for an application. Users may use the application to request media programs from a video delivery service. In one embodiment, the video delivery service aggregates different media programs from different sources and determines which media programs should be displayed in the user interface. This allows the users to browse and select which media programs the users want to watch. The video delivery service may also include different display content on the interface, such as advertisement (ad) campaign content, media program campaign content, and recommendation content. For example, the video delivery service may communicate with an advertisement (ad) engine to determine ad campaign content that is available. The ad engine may use ad campaign scores to rate the ad campaign content. Also, the video delivery service may communicate with a media program campaign engine to determine any media program campaign content for the user. The media program campaign engine may use media program campaign scores to rate the media program campaign content. Then, the video delivery service communicates with a recommendation engine to rate the relevance of the ad campaign content or media program campaign content to the user. The recommendation engine may use personalized user information to determine relevance scores for the ad campaign content and media program campaign content. Further, the recommendation engine may add recommendation content that may not have been included in the ad campaign content or media program campaign content.

After receiving the ad campaign content, media program campaign content, and recommendation content, the video delivery service determines which of the ad campaign content, media program campaign content, and recommendation content to display in the interface. For example, for a certain portion (e.g., cover area, section, tray, or window) of an application running in the interface, the video delivery service may decide to display X (e.g., where X is a certain number) number of the display content received from the ad campaign content, media program campaign content, and recommendation content. Because the video delivery service received scores from the ad engine, recommendation engine, and media program campaign engine, the video delivery service needs to combine the different scores in a way that can quantify which content is the best to display to the user in the application. Due to the real-time generation of the user interface, the video delivery service has a limited time to generate the user interface with the display content. Because the different content may be rated differently by the different engines, the video delivery service uses a combination of the scores to select the display content. This provides a more relevant user interface to a user and more efficient use of display content because the ad campaign content and the media program campaign content is considered in combination and not separately. Also, this allows the video delivery service to combine the different display content in the same area of the user interface rather than displaying the ad campaign and media program campaign content in separate areas.

FIG. 1A depicts a simplified system 100 of a content delivery system 101 according to one embodiment. Content delivery system 101 includes a video delivery service engine 102, an ad engine 104, a media program campaign engine 106, and a recommendation engine 108. Video delivery service engine 102 also communicates with multiple clients 110 being used by users for accessing a video delivery service. The video delivery service may provide media programs, which may include videos, audio, clips, and/or other content to users. Video delivery service engine 102 may include any number of servers that communicate with clients 110. For example, the servers may receive requests from clients 110 using an application in a user interface 112. One of those requests may request a view of the application from the servers. A view may be a display of a portion of an application being executed, such as some information is displayed in a user interface as a view. The view may display media programs (or recommendations for media programs) that a user can access using the video delivery service in addition to various ad campaign content, media program campaign content, and recommendation content. The ad campaign content, media program campaign content, and recommendation content may be different from the media programs in that the ad campaign content, media program campaign content, and recommendation content promote some content while the media programs are the media programs that can be requested for viewing by a user.

At certain times, such as when a user logs on, navigates to a new view in the application, or refreshes a view, video delivery service engine 102 receives a client request. The client request may include user information for the user or video delivery service engine 102 may retrieve information for the user. For example, video delivery service engine 102 may determine a context for the request as the current time, identification information for the user (e.g., the user's age, gender, current physical location, type of device being used), a view for the application that the user is currently viewing, a current subscription plan for the video delivery service, any add-ons for the subscription the user has subscribed to, whether the user is paying for the content service and through what payment method, and whether the user is supposed to view advertising based on their subscription.

After receiving the request from client 110, video delivery service engine 102 determines which content to display on the application in user interface 112. As discussed above, video delivery service engine 102 can display ad campaign content, media program campaign content, and recommendation content in a portion of the application in user interface 112. In addition to that display content, video delivery service engine 102 may display other types of content, such as the media programs being offered by the video delivery service and advertisements.

Figure 1B:
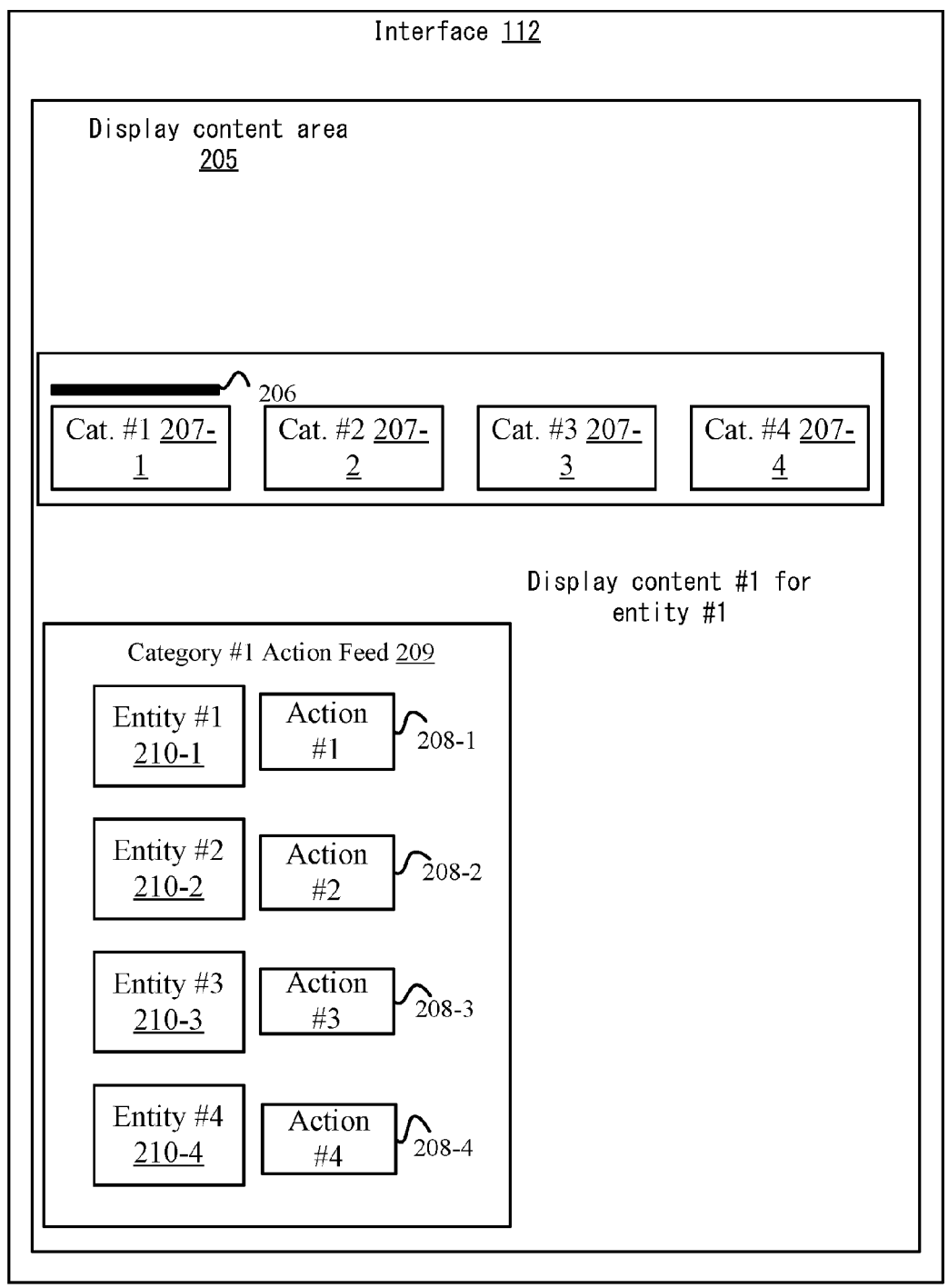
FIG. 1B depicts an example of a user interface according to one embodiment.

FIG. 1B shows an example of user interface 112 according to one embodiment. The content being offered by the video delivery service may include media programs, which may include videos, audio, and other combinations of content. The media programs may include shows that include episodes where the episodes may be released weekly, movies, and music. Video delivery service engine 102 may insert advertisements within the media programs being provided to clients 110. For example, at certain advertisement breaks, video delivery service engine 102 determines advertisements to be inserted into the media programs. In addition to inserting the advertisements in the media programs, video delivery service engine 102 may include ad campaign content, media program campaign content, and recommendation content in portions of user interface 112 while the user is browsing the user interface to select media programs to play. For example, a display content area 205 may be an area of a home view or another view of the application, such as in the background of the view, on the top part of the view, or in a tray in the view. Although a display content area is described, which may be an area in the background of the view that is reserved for the display content, other areas or trays may include the display content in addition to other information, such as media programs that a user can select to play and advertisements.

In one embodiment, interface 112 may display different categories 207-1-207-4 of videos. For example, each of the different categories may have associated display content that was determined by video delivery service engine 102. The categories may be a lineup category, a television category, a movies category, a sports category, and a networks category. The lineup category may be the top ranked entities for a user and the other categories may be specific categories for television, movies, etc. Each category includes its own action feed 209, which are possible actions a user can select. Although these categories are listed, other categories may also be appreciated.

In one example, when a category 207 is selected for the display content, display content area 205 may include display content from ad campaign content, media program campaign content, and recommendation content. Multiple positions shown by entities 210-1-210-4 can include different display content. The positions may cause the display of only one piece of content at a time in display content area 205. The display content may also scroll either automatically or as directed by user input. In other examples, multiple pieces of display content may be displayed at the same time including anywhere from 2 to N pieces. Also, the number of positions in action feed 209 may be limited to a certain number. For example, only eight positions may be available for display content. In one embodiment, the number is determined based on a calculated probably of receiving an impression for display content. In one embodiment, an impression is when display content is sent to and viewed by a user. For example, video delivery service engine 102 may display one hundred pieces of display content, but the probability that the one hundredth position will receive an impression may be so low that displaying this many pieces is not worth it. In one embodiment, video delivery service engine 102 uses ratings for the ad campaign content, media program campaign content, and recommendation content to determine how many positions to include in display content area 205.

In one embodiment, a selection of category #1 is received using a selector 206. The selection causes the display of action feed 209, which includes entities #1-#4 210-1-210-4 arranged in a predicted order for actions 208-1-208-4 for the entities. For example, entities #1-#4 are shown in an order from top to bottom. For example, entity 210-1 has the highest probability the user will perform the associated action #1 208-1, entity 210-2 has the next highest probability the user will perform the associated action #1 208-2, etc. Also, other entities with associated actions may also be included in action feed 209 after action #4 208-4, but are not shown.

When a user selects an entity #1, then video delivery service engine 102 displays the display content #1 in display content area 205. As different entities 210 are selected by a user, video delivery service engine 102 displays different display content. In one embodiment, the entities that are generated for action feed 209 need to be generated when a user selects the category. Because three different engines need to be contacted and then the display content combined for ranking, video delivery service engine 102 needs to efficiently calculate the ratings. This is a different scenario than one in which each different type of content is displayed in its own individual area, such as ad campaign content, media program campaign content, and recommendation content are each displayed in three separate areas of the user interface.

Referring back to FIG. 1A, to dynamically build the view of the application upon receiving the request, video delivery service engine 102 communicates with ad engine 104, media program campaign engine 106, and recommendation engine 108. Video delivery service engine 102 selects which display content from any of the engines to display for the view. The communications and selection process will now be described briefly and then in more detail.

Video delivery service engine 102 communicates with ad engine 104 in response to receiving a request from client 110. Ad engine 104 is configured to determine ad campaign content based on advertising campaigns. In one embodiment, the ad campaign content may include sponsorship content that can be displayed in user interface 112. For example, the sponsorship may include a sponsorship logo that can be displayed for a user impression in user interface 112. The logo may include any information for an advertiser, such as identification information for the advertiser. The ad campaign content is meant to be shown with other content, such as a media program. One example may be a logo for a company is shown with a certain movie. The ad campaigns may specify which content they can be shown with, which may include specific content (a movie name), a type of content (anime or horror movies), or no restrictions.

Ad engine 104 may determine whether any ad campaigns are running at the current time that qualify for this user's impression. For example, ad engine 104 determines whether there are running ad campaigns that are valid to be shown to the user given information about the user, such as the user's age, gender, location, device, which application or web view the user is currently viewing, and if the user has already seen a particular ad campaign too many times.

Ad engine 104 generates ad campaign scores for each ad campaign based on how important it is to get an impression for the ad campaign currently. The ad campaign score is based on various factors associated with the campaign characteristics, such as the ad campaign's impression goal, impressions already gathered, remaining time, revenue generated per X number of impressions, and desire to evenly pace impressions delivered for a particular ad campaign over the course of that campaign. This process will be described in more detail below.

Ad engine 104 can then return a set of ad campaign content for video delivery service engine 102 to consider. The determination of any possible ad campaign content may be skipped if video delivery service engine 102 receives a context that the user should not see advertising based on their current subscription.

Additionally, video delivery service engine 102 contacts media program campaign engine 106. Media program campaign engine 106 determines whether certain media programs should be promoted to receive impressions. For example, a sponsor may have paid to promote a particular theatrical trailer, or the video delivery service committed to provide a particular television network's show promotion, a set number of impressions. The promotion may include showing some information regarding the program, such as "Watch the [television show name]". Media program campaign engine 106 may determine which media program campaign content is eligible for an impression for the user based on campaign requirements. For example, the requirements include a specific time period up to an impression goal where the video program campaign content promotes certain media programs. Media program campaign engine 106 may generate media program campaign scores for each the media program campaign content based on these requirements. The process of generating the scores will be described in more detail below. Then, media program campaign engine 106 returns the set of media program campaign content to video delivery service engine 102.

Video delivery service engine 102 takes the advertising campaign content and media program campaign content and contacts recommendation engine 108 to provide relevance scores for the ad campaign content and media program campaign content. Recommendation engine 108 may generate relevance scores for the content based on the characteristics of the user. For example, recommendation engine 108 determines how likely it may be that the user will interact with the content (e.g., an impression is recorded) if the display content is shown on user interface 112 at the current time.

Recommendation engine 108 may use information about the user's affinity at the current time for the media program being associated with the ad campaign or the media program campaign. An affinity is the measurement of how likely a user will think a media program is relevant based on the user's watch tastes and preferences. The affinity may be recalculated on a regular basis based on what specific media program and types of media programs the user has watched, searched for, browsed to, and rated favorably based on different times of day, days of the week, and on which different devices.

Additionally, recommendation engine 108 can consider the action that it could suggest to the user for each content. For example, for a television series that the user has never watched that has a never-ending continuity in terms of story arc, recommendation engine 108 might suggest watching the first episode of the first season instead of starting watching at season five. This is because of the story arc dependency, starting at season five would be undesirable because the user would not fully understand what is going on in the media program. In addition, recommendation engine 108 may consider any restrictions on actions based on the media program campaign or the ad campaign. For example, the campaign may have specified a media program, such as a specific trailer, episode, or movie to be promoted, rather than a general television series. In one example, a media program campaign promoting the specific episode #7 of a television show may reduce the recommendable actions to just "watch episode" for that episode and "resume episode" for users who have already started it. Thus, recommendation engine 108 cannot recommend "watch episode #1 in season #1 " in this case. Recommendation engine 108 may provide a lower relevance score for this media program campaign.

Not all of the actions may be of equal relevance to the user at the current time. For example, if the user has already spent several hours using the video delivery service during their current session, then watching a movie as an action may be less relevant because the user may be less likely to spend several more hours of free time to complete the movie. Similarly, a user who has never watched a dramatic series may best begin at episode #1 of season #1, rather than episode #7. Therefore, recommendation engine 108 incorporates both a user's affinity for the media program in general and the relevance of the action that would be suggested to the user at the current time to generate the relevance scores.

It is possible that recommendation engine 108 generates no relevant actions for the user to take for a certain media program. For example, there may be no unwatched episodes or movies for a media program. This is based on the media programs currently available on the video delivery service, the user's past behavior, the user's current device, the user's subscription, and content add-ons. In these cases, the relevance of the media program may be very low or zero even if the user has a high affinity for the content.

In one embodiment, recommendation engine 108 may also include additional recommendation content along with respective relevance scores for any content that were not received from video delivery service engine 102. For example, additional media programs may be considered highly relevant to the user at the current time. Recommendation engine 108 may use the same criteria as described above to generate the relevance scores for the additional media programs. In one embodiment, recommendation engine 108 recommends appropriate media programs based on the current status of the user, such as from genres, content types, and television networks that are appropriate for the view the user is currently viewing.

After communicating with ad engine 104, media program campaign engine 106, and recommendation engine 108, video delivery service engine 102 determines which set of content to return to client 110 for display on user interface 112. In this case, video delivery service engine 102 has received input from at least three different separate engines that have determined content using different methods. Also, the three separate engines have provided scores including ad campaign scores, media program campaign scores, and relevance scores. Video delivery service engine 102 can use the different scores to select which content to display on the view of the application. This scoring process will be described in more detail below.

Video delivery service engine 102 ranks the display content received from the different sources and selects a set of display content for client 110. For example, video delivery service engine 102 may use the context for the user, such as the view the user is currently viewing, the user's device, the time of day, day of the week, user experience, and the likelihood of receiving an impression in each position of a list for the set of content to determine which content should be provided to client 110. In one example, there may be a 100% chance of receiving an impression in a first position of the list, but only a 40% chance of receiving an impression in position #2 of the list. Video delivery service engine 102 positions display content in the list such that the display content that is very important to receive an impression (e.g., a sponsored logo campaign with a high impression importance score) is in a position with a high likelihood of receiving an impression.

Video delivery service engine 102 determines a maximum number of display content to return for the impression by not returning any more content to client 110 than is likely to receive an impression. For example, if the ninth position in the list has only a 0.1% chance of getting an impression, video delivery service engine 102 may only return eight items of content to client 110.

Also, video delivery service engine 102 receives an action from recommendation engine 108 against each content with the highest relevance. For example, for the set of content, recommendation engine 108 provides the recommended action. For example, if video delivery service engine 102 determines that a television series will be returned as content to be promoted, video delivery service engine 102 determines the action for that television series, such as "resume episode #1 of season #4" if the user was in the middle of that episode the last time the user interacted with the television series.

The following will now describe the engines in more detail in addition to the scoring process.

Ad Engine 104

Figure 2:
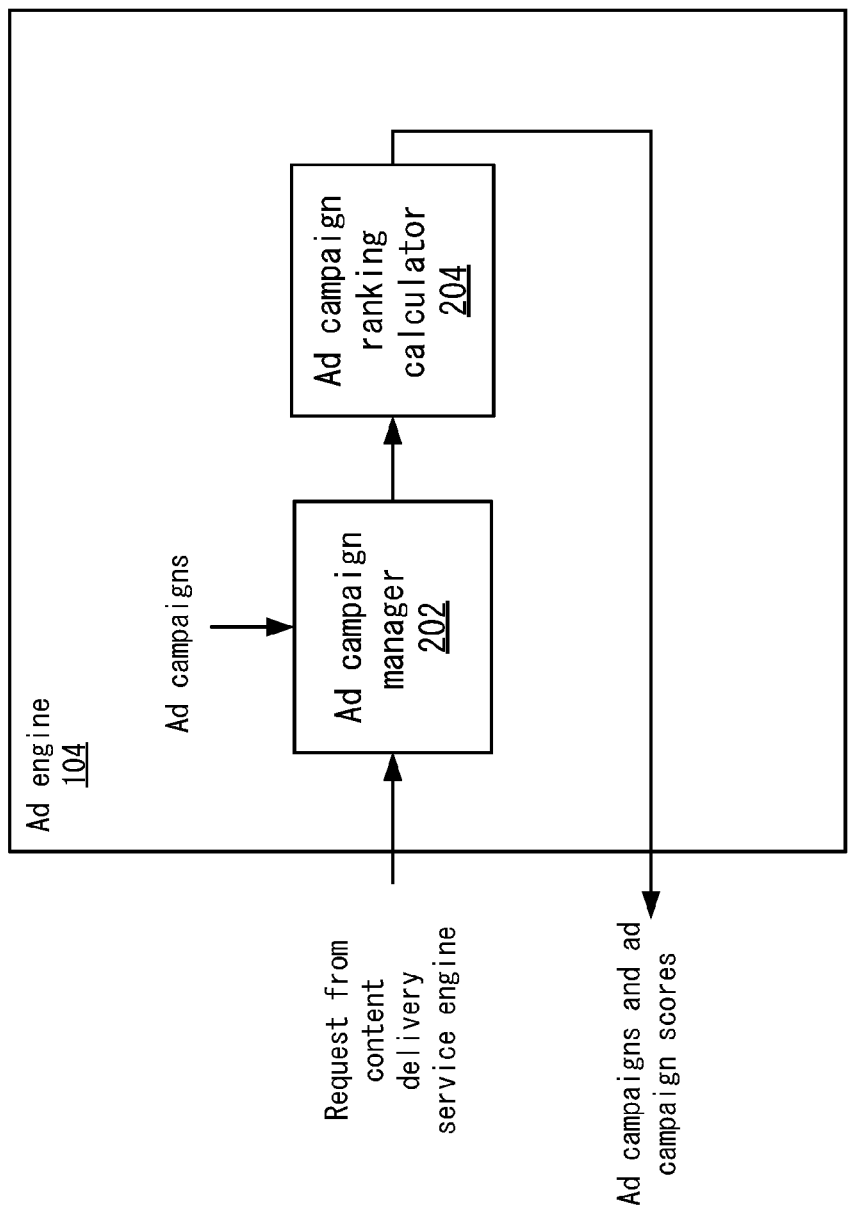
FIG. 2 depicts a more detailed example of a video delivery service engine and an ad engine according to one embodiment.

FIG. 2 depicts a more detailed example of ad engine 104 according to one embodiment. An ad campaign manager 202 receives a request for ad campaigns from video delivery service engine 102. Ad campaign manager 202 can then select any ad campaigns that may qualify for this user's impression. For example, ad campaign manager 202 can filter ad campaigns from storage 206 that are not appropriate for the request. In one embodiment, ad campaign manager 202 may use characteristics of the user, such as the current user's demographic, location, view, and/or device context, to select running ad campaigns that qualify for the user. Also, ad campaigns that may not be running at the time are filtered out. In other embodiments, ad campaign manager 202 selects ad campaigns that are eligible for any user impressions without regard to the current user's characteristics.

An ad campaign ranking calculator 204 receives the eligible ad campaigns and can then generate ad campaign scores for each selected ad campaign. The ad campaign scores indicate how important it currently is to get an impression for the ad campaign. This score may not take into account the user that will possibly view the ad campaigns. Rather, the ad campaign score is related to fulfilling the ad campaign requirements for impressions. In one embodiment, the ad campaign scores may be within a first range, such as from 0-1000, where a 0 score means it is not important to receive an impression and a 1000 score means it is the most important to receive an impression. Although the range of 0-1000 is discussed, other ranges may be used. However, as will be discussed in more detail below, the first range for the ad campaigns may be generated taking into account what the ranges are for the media program campaign content and recommendation content. In one embodiment, the highest possible score for ad campaign content is higher than the highest possible score for the media program campaign content and recommendation content because the video delivery service considers the ad campaign content most important to get an impression. This may be because advertisers are paying the video delivery service for impressions.

The ad campaign score may be based on different factors, such as the hourly rate of impression delivery that would be necessary to reach the total impression goal of the ad campaign, the rate at which this campaign is qualifying for user impressions, and the historical traffic the application has experienced at different times, such as times of the day, days of the week, or days of the year. For example, if there are 24 million impressions left and 1 day left in the duration of the ad campaign, on average, 1 million impressions/hour are needed to reach the goal. However, the video delivery service may not have user traffic using the service that is even throughout the day, such as more impressions (e.g., 2 million/hour) may be served at certain hours and less impressions (around 0/hour) are served in other hours. Thus, the current hour's estimated needed hourly rate of impression for delivery might be different from other hour's rates.

Ad campaign ranking calculator 204 may calculate the score based on whether the impressions/hour estimated are needed for this hour (also time periods other than an hour may be used) to achieve the total impression goal of the ad campaign is a small or large portion of the hourly impressions of traffic expected against the application at this time times the rate at which this campaign is qualifying for impressions. For example, if 1 million impressions/hour are needed, and the video delivery service expects to receive 10 million impressions/hour of traffic, and this ad campaign is qualifying for impressions 10% of the time, then it is expected that 1 million impressions will be available for the ad campaign (10% of 10 million=1 million). Because 1 million impressions are needed for the ad campaign and only 1 million are expected, ad campaign ranking calculator 204 considered it very important to use this impression and generates a high score, such as 1000. Another factor considered may be competition from other campaigns. For example, a first ad campaign has an hourly impression goal of 500,000 impressions. If there are 1,000,000 eligible impressions for the 500,000 impressions needed to meet the goal, ad campaign ranking calculator 204 might set a lower score, such as 500 compared to the above score of 1000 in the last example. However, if there are more ad campaigns available, such as two ad campaigns each with delivery goals of 250,000 impressions, that are also eligible for the same 1,000,000 predicted impressions, ad campaign ranking calculator 204 would raise the score for all three campaigns to a higher score, such as 1000. The higher score recognizes the limited number of ad impressions that are available compared to the number of ad impressions that are needed by the three ad campaigns. Ad campaign ranking calculator 204 then sends the set of ad campaigns and ad campaign scores to video delivery service engine 102.

Media Program Campaign Engine 106

Figure 3:
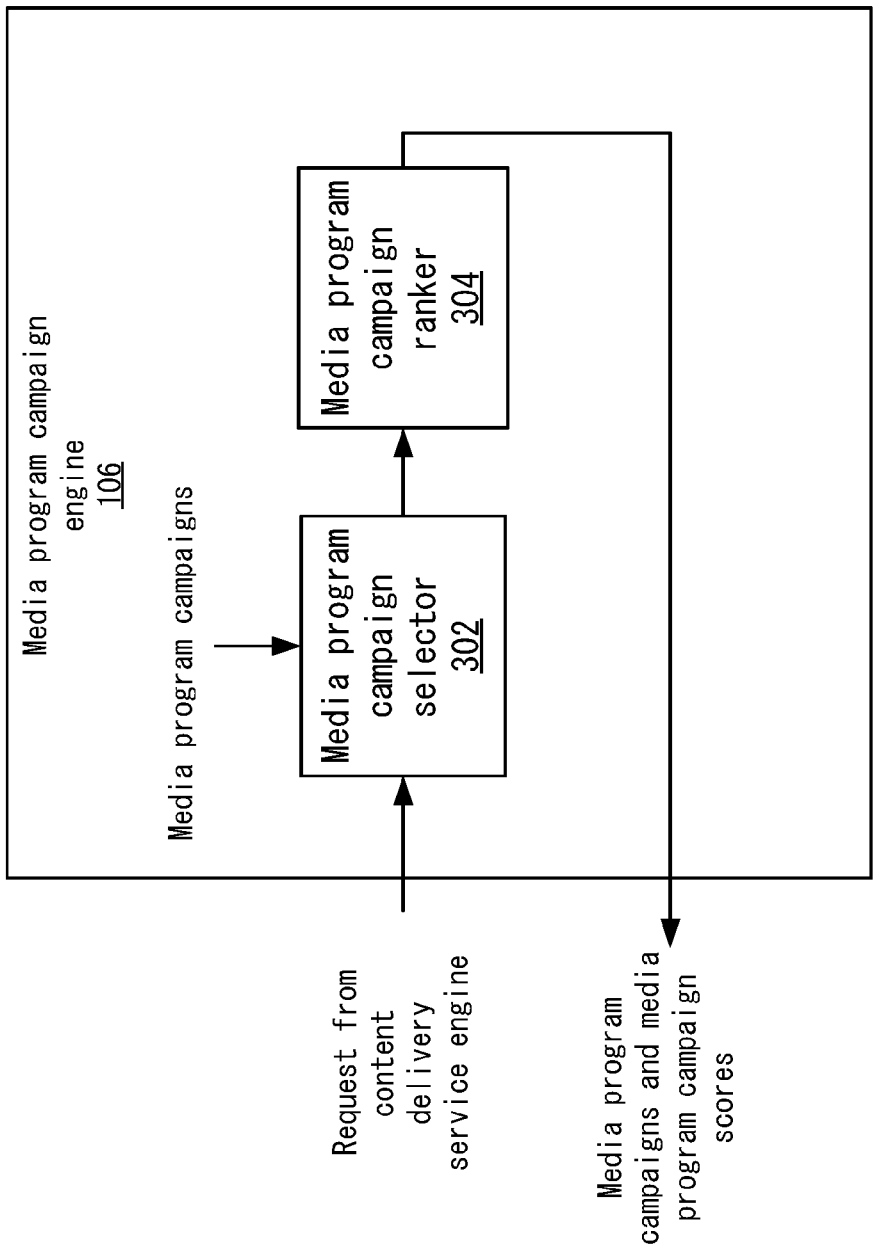
FIG. 3 depicts a more detailed example of the video delivery service engine and a media program campaign engine according to one embodiment.

FIG. 3 depicts a more detailed example of media program campaign engine 106 according to one embodiment. A media program campaign selector 302 receives a request for media program campaigns from video delivery service engine 102. Media program campaign selector 302 can then determine which media program campaigns from storage are eligible to receive impressions from any users. For example, these media program campaigns may be the media program content campaigns that are running at the time. In other embodiments, media program campaign selector 302 may use characteristics of the user to select media program content campaigns that qualify for the user. Also, media program content campaigns that may not be running at the time are filtered out.

Media program campaign ranker 304 generates media program campaign scores for the eligible media program campaigns. In one embodiment, media program campaign ranker 304 generates scores within a second range, such as from –X to Y (e.g., –800 to 800), where X and Y are numbers. The lower the score means that it is less important to receive an impression for this campaign. At the score of 0, the media program campaign has reached its impression goal. That is, the media program campaign has received its goal of impressions within a time period. However, the media program campaign may still qualify and receive impressions even though the goal has been reached in the time period. Additionally, a negative score means that the media program campaign may be over delivered, which means the number of impressions is over pacing. The more negative means that the campaign has already achieved its goals (on an hourly, weekly, etc. basis), and the video delivery service may want to favor not showing the media program campaign more.

In one embodiment, the maximum media program campaign score may be lower than the maximum score for ad campaign content. This configuration may occur because there is a revenue directly associated with ad campaign content (due to the video delivery service receiving payment for an impression or set of impressions for the ad campaigns), and thus ad campaign content is deemed higher priority to receive impressions. In one example, an ad campaign that is under-delivering might always be rated higher than media program campaign content. Although these ranges are described, it is possible to change the ranges or make them equal. The changes can be done dynamically, such as when it is detected that media program campaigns become more important to receive impressions.

Media program campaigns specify their priority, such that media program campaign ranker 304 knows when it absolutely must meet the impression goal of a campaign (e.g., highest priority) vs. under-delivering on one campaign in order to meet the needs of a higher priority or advertising campaign. Additionally, if the media program campaign being promoted is sufficiently irrelevant for a user, media program campaign ranker 304 can decide not to serve an impression and thus under-deliver on a lower priority campaign. Media program campaign ranker 304 takes into consideration the media program campaign's priority, the impression goal and impressions already achieved (overall or per user), and the remaining time for the media program campaign to assign a media program campaign score that rates the importance of each qualifying media program campaign.

In one embodiment, media program campaign ranker 304 may generate scores based on the number of impressions per unique user and/or the total impressions for a media program content campaign. When the impression goal is expressed as a number of impressions per unique user, as unique users that use the video delivery service over the course of the media program campaign, media program campaign ranker 304 attempts to reach (but not exceed) the number of impressions for every active qualified user. Media program campaigns may target a specific subset of the video delivery service user population, such as users who have recently joined the service, so not all users may necessarily qualify for a media program campaign. In general, media program campaign ranker 304 attempts to evenly pace impressions for a particular user over the course of the media program campaign. However, every user may have different lengths and frequencies of interactions with the video delivery service, which increases or decreases chances of serving impressions. Also, generally, as the media program campaign gets closer to ending, the chance of successfully serving impressions decreases as users going back in time is not guaranteed.

In one example, media program campaign ranker 304 may use an equation of:

$$\text{Media program campaign score} = 100 * \# \text{ of expected impressions} - \text{actual impressions for a user.}$$

The number "100" is a constant that can be another value, the "# of expected impressions" is the expected number of impressions per every unique user, such as 5 impressions may be expected for each unique user. The "actual impressions for a user" is the number of impressions actually received for a user. The actual number may be at first estimated. For example, there may be some delay between a user getting an impression of certain media program campaign content and video delivery service engine 102 receiving notice of this occurrence due to delays, such as in client-server communication or the delay between the client loading the media program campaign content and the media program campaign content coming into view in the application (such as in the case of a list that shows new content every X seconds). The estimated current number of impressions may be based in part on actual impressions achieved that are added to the number of times the media program campaign was returned to client 110 for a potential impression. In some cases, the likelihood that the positioning of the content will result in an impression may also be factored in by multiplying the likelihood by the total estimated number. Media program campaign ranker 304 may at first use the estimated number, but then switch to the actual impressions when notice of the occurrence is received.

Media program campaign ranker 304 may also use the total number of impressions to generate the media program campaign scores. For example, the following is used:

Media program campaign score=100*(# of expected impressions)/(total impression goal for this media program campaign/length of campaign in time).

For example, a 10 hour campaign with a goal of 20 million impressions should be delivering, on average, 2 million impressions/hour. However, if only 8 million impressions have been delivered after 5 hours (rather than an expected 10 million impressions), then the media program campaign is behind (an hour or 2 million impressions). The media program campaign score is then 100*number of hours behind (positive score) or ahead (negative score)=100*(1) =100. If the campaign was 2 hours ahead, then the score would be 100*(−2)=−200. If the campaign was 2 hours behind, then the score would be 100*(+2)=+200.

The media program campaign's impression goal may be expressed as total impressions in which case the video delivery service delivers impressions evenly over the course of the media program campaign, but the video delivery service may serve more impressions to some users and less to other users when the content is less relevant. Media program campaign ranker 304 attempts to reach delivery goals but avoid over-delivering to free up impressions for other media program campaigns and recommendations.

Media program campaign engine 106 then sends the eligible media program campaigns back to video delivery service engine 102.

Recommendation Engine 108

Figure 4:
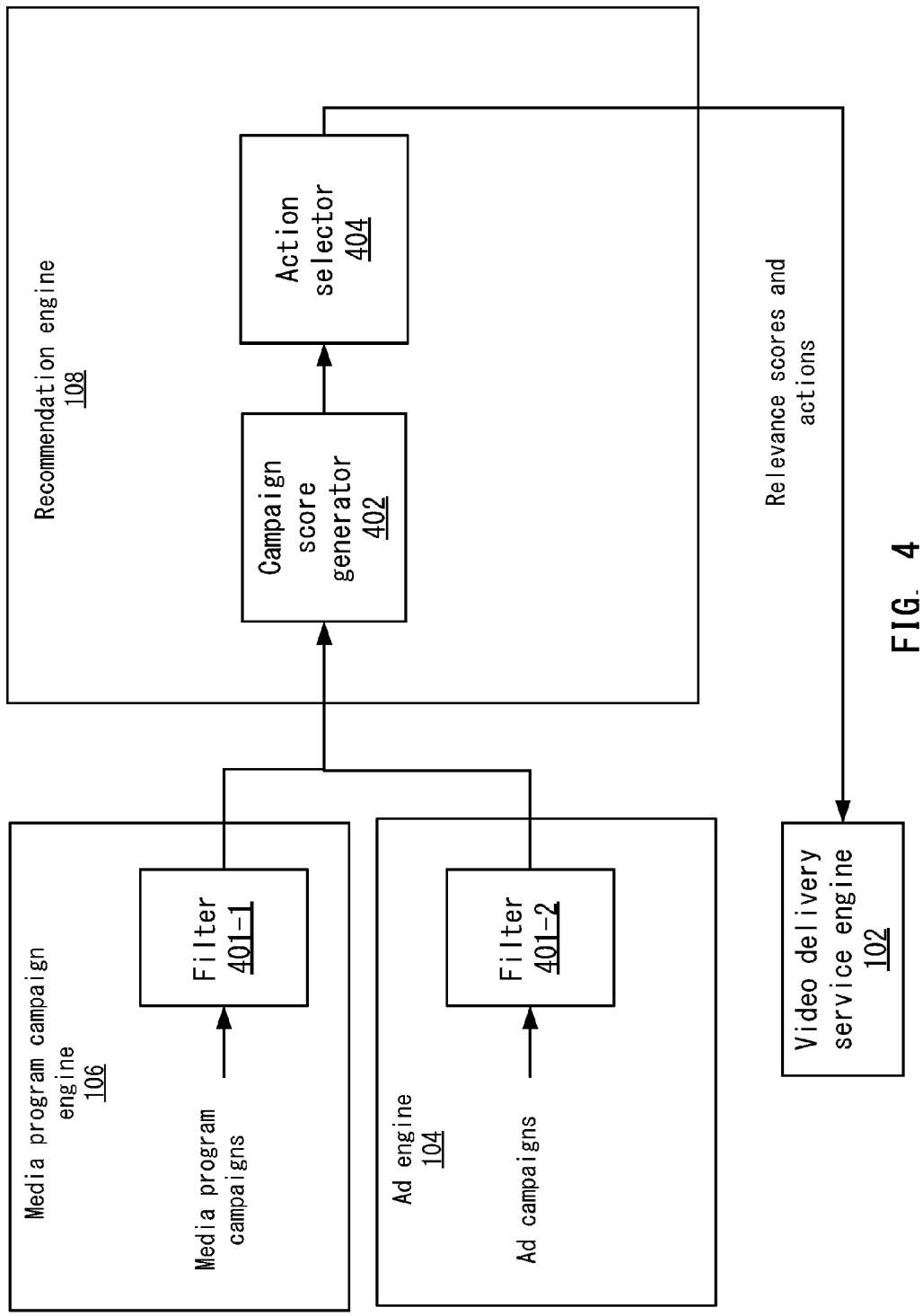
FIG. 4 depicts a more detailed example of a recommendation engine and the video delivery service according to one embodiment.

Once video delivery service engine 102 determines the set of media program campaigns and the set of ad campaigns, recommendation engine 108 may generate relevance scores for the campaigns. FIG. 4 shows a more detailed example of recommendation engine 108 and video delivery service engine 102 according to one embodiment. Before sending the media program campaigns and ad campaigns to recommendation engine, content delivery system 101 may filter some of the content. For example, media program campaign engine 106 may have filtered the media program campaigns using a filter 401-1 before sending the media program campaigns to video delivery service engine 102. Also, ad engine 104 may have filtered the ad campaigns using a filter 401-2 before sending the ad campaigns to video delivery service engine 102. The filtering may be based on a context associated with the user. In one example, filter 401-2 can determine which ad campaign content should be filtered. For example, not all ad campaigns qualify for an impression due to the context associated with the user, such as the user may be the wrong age, gender, be physically located in the wrong location, the user might be using the wrong client device, or may be on the wrong view or area of the application. Also, filter 401-2 may take the mapping of running ad campaigns (e.g., sponsorship campaigns) to the content those campaigns are valid to be shown with. In one example, a sponsor's logo is (or is not) allowed to be shown with particular content, such as a television series, movie, episode, genre of content, content from a particular television network, content with a particular age rating, or any combinations of the above. Some content may be a valid vehicle for displaying a sponsorship logo, but invalid to show to the user at this time based on the view the user is on. For example, a soft drink logo may be valid to show on a television series, but the user is on a view for Korean dramas. To disqualify a soft drink logo plus a television series combination for this impression due to the television series not belonging to the Korean drama genre. This may disqualify some ad campaign content. In other examples, certain client user experiences on certain devices may require specific assets to exist on the video delivery service to render a content recommendation. For example, an image of a particular resolution and aspect ratio or a video of a particular duration may be needed to provide a recommendation.

Also, filter 401-1 disqualifies any media program campaigns that might not be eligible to be provided to the user. For example, filter 401-1 uses information on whether the display content being promoted by the media program campaigns belongs to a certain content type, genre, or television network to determine qualifying campaigns for the view the user is currently viewing. For example, only media program campaigns in the television shows for a television network may be shown on the network's view, or media programs belonging to the genre anime may be shown on the anime view, or a type of movie trailer may be shown on the movie trailers view. Additionally, filter 401-1 can disqualify media program campaigns based on user characteristics, such as media program campaigns that are promoting media program not appropriate for the user's current description or add-ons, billing type, device, or lifetime on the video delivery service. For example, it may not be appropriate to show media program campaigns with in-application billing prices when promoting a particular video delivery service feature to a user who is paying for the video delivery service directly.

Therefore, filters 401-1 and 401-2 may filter the ad campaign or media program campaign to just the campaigns that can be rendered given the current context (e.g., such as a video or image exists that is compatible with the user or device). Although filtering is described, in other embodiments, filtering may not be performed and all of the eligible media program campaigns and ad campaigns may be sent to recommendation engine 108.

It is also possible that there are no ad campaigns or media program campaigns running and that the video delivery service does not know enough about the user to generate relevant content recommendations. For example, the user may not be signed in to the video delivery service. In this case, video delivery service engine 102 falls back to generate recently-released or generally popular campaigns.

In recommendation engine 108, a campaign score generator 402 generates relevance scores for the campaigns that may be shown for this impression to the user. For example, campaign score generator 402 determines how likely it may be that the user will interact with the campaign if shown at the current time. In one embodiment, the relevance scores may be in a third range, such as 0.0001-70. The higher the value of the relevance score means that the content is more relevant to the user. The highest score for the relevance scores may be lower than the highest scores for the ad campaign scores and media program campaign scores. The relevance scores may be lower because the relevance scores may be used to distinguish between content that may have a score that is close. For example, if a first ad campaign and a first media program campaign score are about the same, the relevance score may be used to distinguish which content is most relevant to the user.

The relevance score may be based on the probability that this user will engage with the content at the current time. The content that is scored may be based on the campaign. For example, an ad campaign may specify a media program, such as a logo will specify it can be shown with a specific media program (or multiple media programs). The relevance of the specific media program may be scored. Also, for a media program campaign that is promoting a media program, the relevance of that media program is scored. The probability may be based on the user behavior or other behavior from other users that are similar to this user. This behavior may include watch behavior, search behavior, search history, ratings of similar content (e.g., a star rating such as 5 stars given by the user or a positive/negative rating), and explicit preferences (e.g., I am interested in anime) of groups of content this content is in. In one example, a classifier is trained based on users' behavior and outputs a score based on the user's characteristics.

Also, it is desirable to avoid recommendation repetition. It is possible that a particular user's behavior does not change significantly enough over a specific period of time to significantly change the ranking of the top videos (e.g., shows and movies) for that user in terms of relevance scores. To decrease repetition of recommendations for a particular user by the video delivery service, campaign score generator 402 may consider the recent impressions of content by this user to determine relevance scores. For example, a highly-relevant title that the user has already been recommended many times today may be rated lower if the user had not seen it at all today. Further, a lower rated title may be rated higher so that the content can have the chance to be ranked higher. The rescoring may be first performed by grouping by a television series where all content for the television series is boosted or decreased by the same amount. This is done such that individual episodes for a television show for a user is preferred over promoting the television series in general to the user. This rescoring may be performed periodically, such as every two hours.

Additionally, an action selector 404 considers an action that could be suggested for the user for each campaign. For example, for a television series associated with a media program campaign that the user has never watched and has never-ending continuity in terms of story arc, action selector 404 may suggest watching the first episode of the first season. Also, the media program campaign or advertising campaign may also put restrictions on the action that can be suggested. The campaign may have specified a specific trailer, episode, or movie to be promoted rather than a general television series. For example, a media program campaign promoting specifically episode #7 of a television show may reduce recommendable action to just "watch episode" for that episode and "resume episode" for users who have already started the episode.

Also, not all actions are of equal relevance to the user at the current time. For example, if the user has already spent several hours using the video delivery service during a current session, then watching a movie as an action is less relevant because the user is less likely to have several more hours of free time to complete the movie. Similarly, a user who has never watched a dramatic series may have the best action be to begin at episode #1 of season #1, rather than episode #7. Therefore, recommendation engine 108 may incorporate both the user's affinity for the content in general and the relevance of the action, recommendation content service 406 uses to generate the relevance scores.

It is also possible that there may be no relevant actions for the user to take at the current time for the ad campaign or media program campaign. For example, there may be no unwatched episodes or movies. This is based on the media programs currently available on the video delivery service, the user's past behavior, their current device, subscription, or content add-ons. In this case, the relevance of the media program may be very low or zero even if the user has a high affinity for the media program. In one embodiment, the value of zero may be specially treated. For example, if a value of zero is assigned, then the content may not be delivered no matter how highly rated the content is. For example, if a user has seen the same media program content multiple times, such as 6 times in a day, then the relevance score is decreased each time the media program campaign content is seen, and then when the relevance score reaches 0, then the media program campaign content will be removed.

After generating the actions and relevance scores, a recommendation content service 406 can generate a list of additional unique content along with respective relevance scores that are different from content that video delivery service engine 102 asked recommendation engine 108 to judge. This recommendation content is determined to be highly relevant to the user at the current time. Recommendation content service 406 may use the same criteria to generate the relevance scores to determine the recommendation content, such as using the user's watch history to determine which content the user may be most interested in watching.

Video Delivery Service Engine 102 and Client 110

Figure 5:
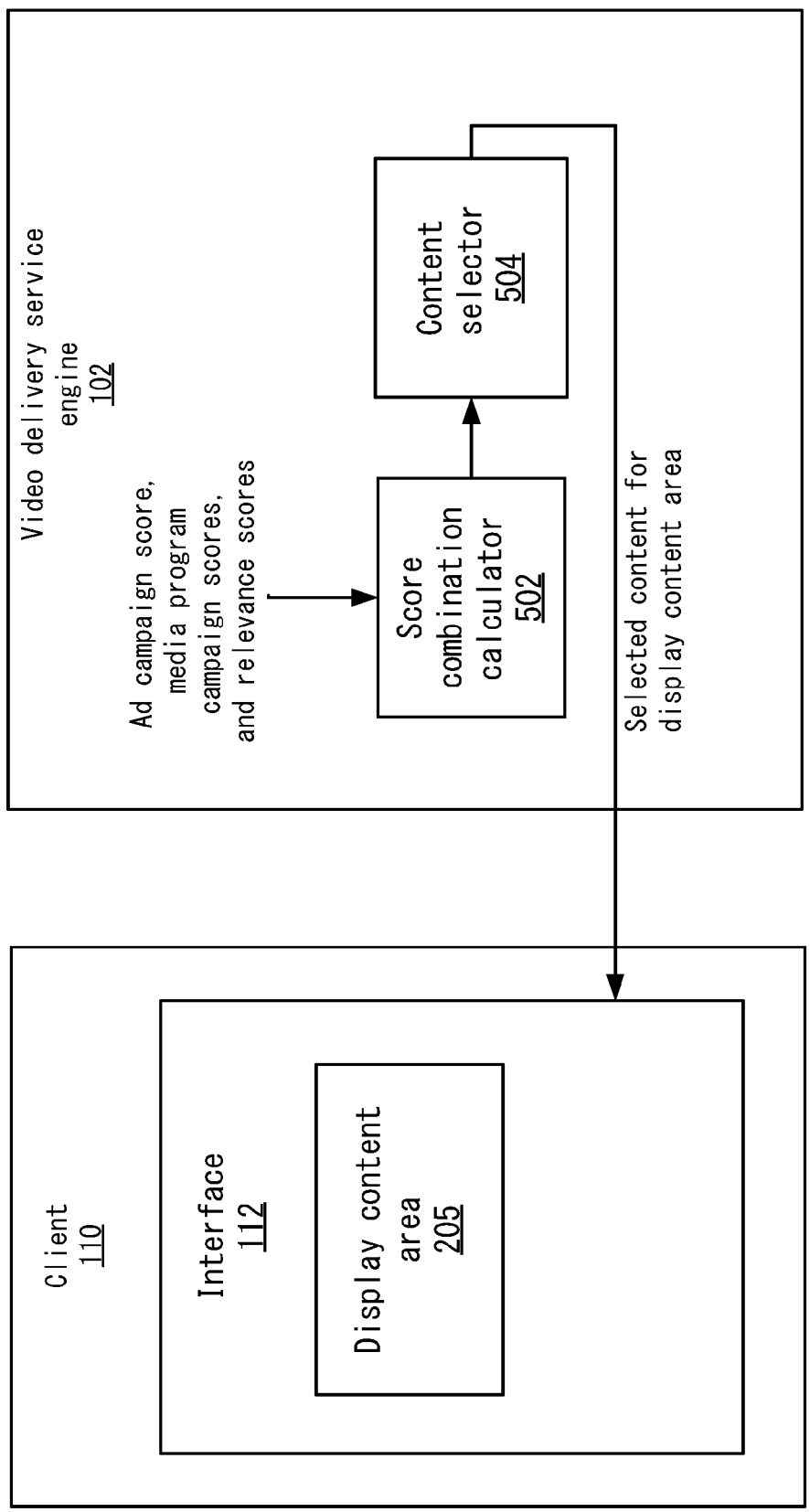
FIG. 5 depicts a more detailed example of the video delivery service according to one embodiment.

Recommendation engine 108 then returns the relevance scores for the ad campaigns and media program campaigns along with the recommended content. At this point, video delivery service engine 102 can then determine a final set of display content to return in response to client 110. FIG. 5 depicts a more detailed example of video delivery service engine 102 according to one embodiment. A score combination calculator 502 receives the ad campaign scores, media program campaign scores, and relevance scores for the respective content. Then, score combination calculator 502 uses the scores to calculate a combined score that takes into account the ad campaign scores, media program campaign scores, and relevance scores. Because scores were received from three separate engines, the combined score is used to rank different content against each other.

Score combination calculator 502 combines scores for a piece of content when available. For example, there may be a case where an ad campaign content is provided. If there is not a corresponding media program content campaign, then score combination calculator 502 may combine the ad campaign score with the relevance score. A corresponding media program content campaign may be a media program in which the ad campaign is designated to be shown with. One example of this is a logo shown over a media program campaign. This would provide impressions for the ad campaign and the media program content campaign. If there is a corresponding media program content campaign, then score combination calculator 502 adds the ad campaign score, media program campaign score, and relevance score.

In one embodiment, video delivery service engine 102 does not want to duplicate promotion of the same content, such as a television series or movie, in a particular set of content that is sent to client 110. For example, an ad campaign and media program campaign for the same television series may be consolidated into either an ad campaign or media program campaign impression. Also, a specific logo may be allowed to be shown on multiple videos, such as television show #1, television #2, movie #1, etc. This may form 5 different pieces of content. In one embodiment, score combination calculator 502 selects the highest scoring content out of the five pieces of content. Then, score combination calculator 502 filters out the other pieces of content from being ranked. This may set the combined score (or just the ad campaign score or just media program campaign score) to zero, which will lower the probability that these other pieces of content will be displayed again.

Then, content selector 504 may select content that has/have position restrictions. For example, an ad campaign content may have position restrictions for only positions 1-3 of display content area 205. Score combination calculator 502 may select the ad campaign content and place it in position #1 (or #2 or #3) of display content area 205. One reason score combination calculator 502 selects the ad campaign is so that the impression goal can be reached for the ad campaign and then the position restriction will not have to be considered. In other embodiments, score combination calculator 205 may not automatically place content that has position restrictions, but rather just uses the total scores.

The rights that the video delivery service has to play media programs for its users may change over the course of time and may differ depending on the device being used, the user's subscription plan, and content add-ons. Thus, if a media program being recommended or promoted is unplayable for the user at this time, video delivery service engine 102 may not return this campaign to client 110.

At client 110, user interface 112 may render the content such that not all content returned to client 110 is immediately visible to the user. For example, client 110 may display a first piece of content and wait for a user action or a specific period of time before proceeding to display the next piece of content. For example, the user may select a scroll command to view the next piece of content or after a time expires, the next piece of content is displayed. Alternatively, client 110 may display the content as a list or some of the content (e.g., nearer to the bottom of the list) is not immediately visible on user interface 112. As such, it is not guaranteed that all of the set of content returned to client 110 will be sold in an impression.

Video delivery service engine 102 may know for every user, view, device, time of day, day of the week, and user experience the likelihood of receiving an impression in each list position. For example, there may be a 100% chance of getting an impression in a first position, but only a 40% chance of receiving an impression in position 2. Video delivery service engine 102 may determine the positions of the content based upon the combined scores.

Video delivery service engine 102 may also determine the maximum number of sets of content to return for the impression by not returning any more content than video delivery service engine 102 determines if it is likely to receive an impression. Video delivery service engine 102 also appends the relevant action received from recommendation engine 108 to any of the set of contents selected.

After the content is rendered on client 110 for the user, user behavior may be observed. For example, implicit and explicit user actions are logged by client 110 and sent to client delivery service engine 102. For example, receiving an impression on a particular content may be observing a hover or navigation to, or click on the content. In one example, a user may click on one of the logos of the media program campaign. Also, an impression may be received when the user sets the content as one of their favorites, the user passively allows client 110 to automatically move content received from one piece of content to the next, or the user actively skips over content without engaging with it. Receiving an impression on either a media program campaign, ad campaign, or recommended content decrements the remaining impressions needed for that particular content or sponsor or ad campaign, respectively.

Video delivery service engine 102 may provide the observations to recommendation engine 108. Recommendation engine 108 can then interpret certain user actions as positive indications of the user's affinity for the content and other actions as negative indications. For example, clicking on the content is a positive signal but explicitly skipping content is not a negative signal. In addition, not all actions have equal weight. For example, hovering over content is a weaker positive signal of interest than actually selecting the content. Recommendation engine 108 uses these observations when making further recommendations of content to this user. For example, receiving a negative signal of interest makes it less likely that the content will be recommended for that user or score highly in terms of relevance in the future. Therefore, when logging user actions, whether the content was campaigned for or was the result of recommendations is included as context. This allows recommendation engine 108 to respond to positive or negative signals against just the content it recommended.

Figure 6A:
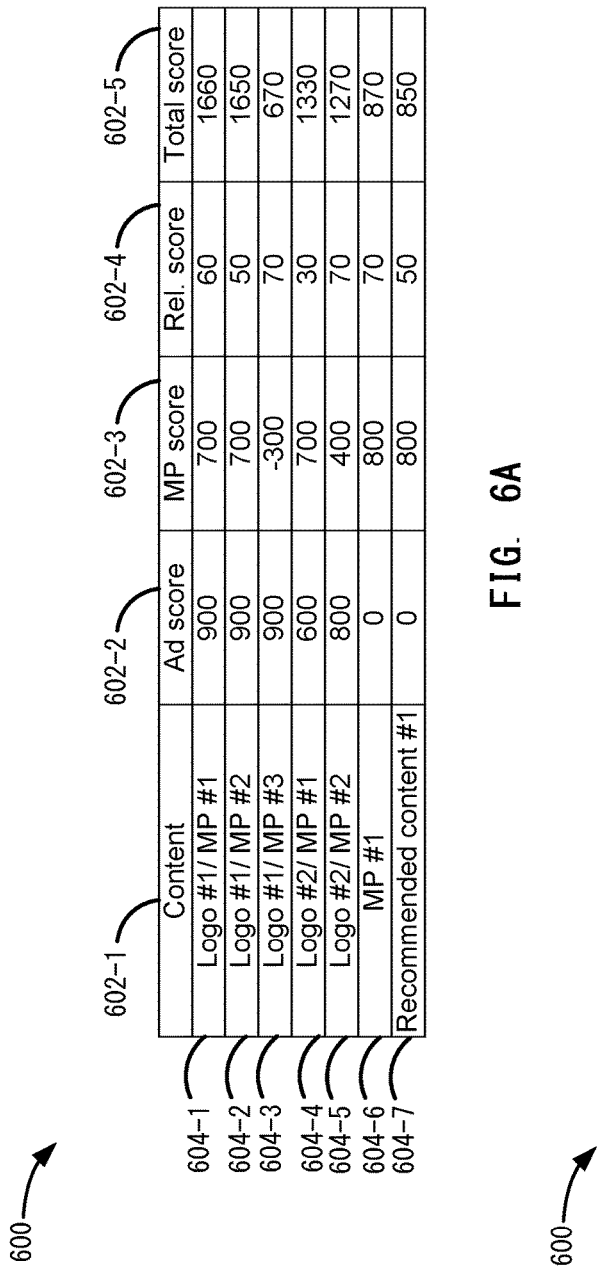
FIG. 6A depicts an example of a database table that a content selector uses to select content for a display content area according to one embodiment.

FIG. 6A depicts an example of a database table 600 that content selector 504 uses to select content for display content area 205 according to one embodiment. The use of table 600 allows content selector 504 to efficiently select content from the various engines.

Table 600 includes a column 602-1 that lists content, and columns 602-2-602-5 for the ad campaign scores (ad scores), media program content campaign scores (MP scores), relevance scores (rel. score), and total scores, respectively. Also, each row 604 may be associated with content that can be included in display content area 205. Rows may be associated with a same piece of content, such as rows 604-1-604-3 are associated with a logo #1 (ad campaign logo). Other content may be associated with just media program content campaigns at 604-6 or recommended content at 604-7.

For each content, if a score is available, it is stored in a respective cell. For example, for logo #1 and media program #1 at row 604-1, the scores are 900, 700, and 60 for the ad campaign score, media program content campaign score, and relevance score. This is a total score of 1660. The other rows have total scores calculated similarly.

Content selector 504 reviews the total scores in column 602-5 to select a set of content. In one embodiment, content selector 504 first selects content with the highest total score. In this case, logo #1 /media program #1 is selected in row 604-1 with the highest score of 1660. This is where logo #1 is shown over a media program content campaign for media program #1.

Figure 6B:
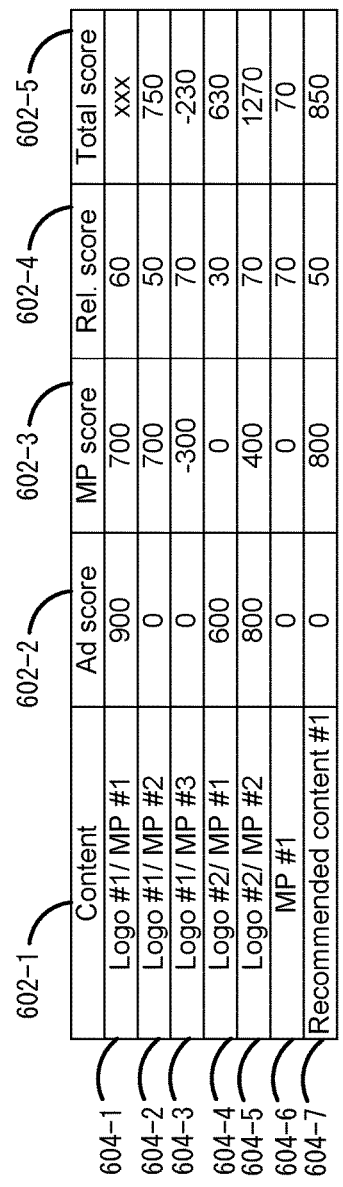
FIG. 6B depicts a second example of the table showing the adjustment due to the selection of content according to one embodiment.

Content selector 504 may then pick a second piece of content for the set of content. The next highest scored content is logo #1 and media program #2 in row 604-2 at 1650. In this case, the relevance score for this combination was slightly lower (50 vs. 60) than the combination in row 604-1. Thus, the relevance score was used to break a tie in scores (1600 to 1600) to determine which combination was more relevant to the user. However, in one embodiment, even though logo #1 and media program #2 has the second highest score, content selector 504 may not want to show multiple instances of the same content (e.g., logo #1). To avoid the duplication, content selector 504 may adjust the scores in table 600 such that duplications are less likely. In one example, content selector 504 may zero out one of the scores in the columns. FIG. 6B depicts a second example of table 600 showing the adjustment due to the selection of content according to one embodiment. Due to logo #1 and media program #1 being selected row 604-1, the total score is changed to "xxx" to indicate that this row should not be selected again. Content selector 504 has changed the scores for logo #1 such that the ad campaign scores have been changed to zero (other amounts may be used) in rows 604-2 and 604-3. This lowers the total scores by 900 for both rows, which lowers the probability that content selector 504 would select logo #1 again. Further, since media program #1 has been shown, the score for media program content campaign in row 604-4 and column 602-3 is lowered to zero to reduce the probability that media program #1 will be shown again. Also, although only the ad campaign score is lowered, other scores may be lower, such as the total score, relevance score, and/or media program campaign score.

With the new scores, content selector 504 selects logo #2 and media program #2 with a score of 1270. Then, after this, content selector 504 selected recommended content #1 for the set of content. The final set of content is logo #1 and media program #1, logo #2 and media program #2, and recommended content #1. In other embodiments, other content may also be included, such as other combinations from the other rows, or content not shown in table 600. For example, logo #2 and media program #1 have a score of 630 and may be included also even though logo #2 and media program #1 will be duplicated in the set of content.

Method Flows

Figure 7:
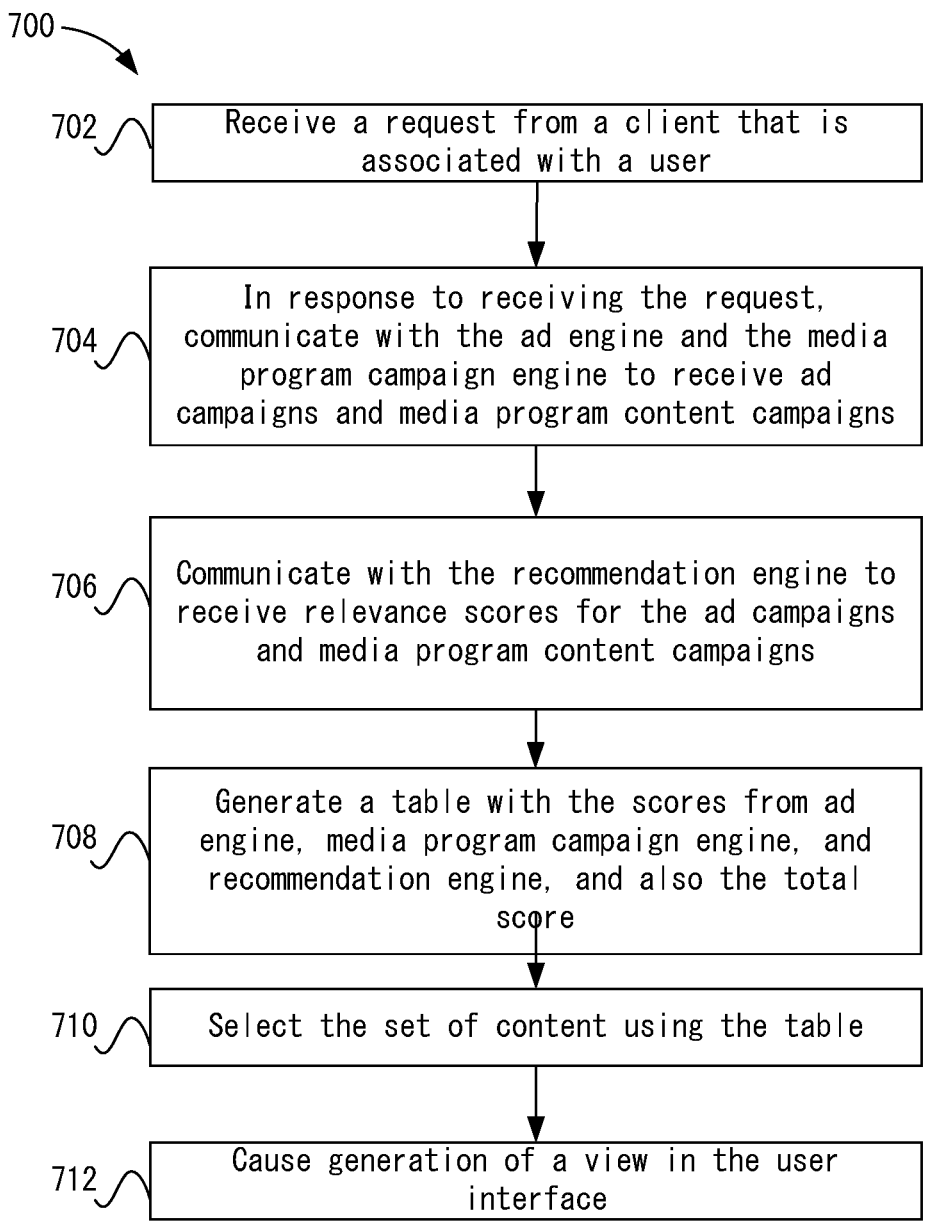
FIG. 7 depicts a simplified flowchart of a method for generating a set of content according to one embodiment.

FIG. 7 depicts a simplified flowchart 700 of a method for generating a set of content according to one embodiment. At 702, video delivery service engine 102 receives a request from a client 110 that is associated with a user. The request may indicate that a view in an application should be generated and returned. The time that video delivery service engine 102 has to generate the view is almost instantaneous and cannot be generated with user intervention.

At 704, in response to receiving the request, video delivery service engine 102 communicates with ad engine 104 and media program campaign engine 106 to receive ad campaigns and media program content campaigns. Then, at 706, video delivery service engine 102 communicates with recommendation engine 108 to receive relevance scores for the ad campaigns and media program content campaigns.

At 708, once receiving the scores, video delivery service engine 102 generates table 600 with the scores from ad engine 104, media program campaign engine 106, and recommendation engine 108, and also the total score. At 710, video delivery service engine 102 then selects the set of content using table 600. The method described above may be used to select the content. At 712, video delivery service engine 102 causes generation of user interface 112, such as a view of the application for the video delivery service is sent to client 110.

Given the dynamic nature of generating table 600 for a specific user and the number of requests that video delivery service engine 102 receives from users, video delivery service engine 102 needs to generate table 600 quickly and also select the set of display content quickly to display interface 112. The use of table 600 improves the functioning of a computing device to allow video delivery service engine 102 to select the set of content in a time required to display interface 112. Also, given the number of display content and possible combinations from ad engine 104, media program campaign engine 106, and recommendation engine 108, video delivery service engine 102 is needed to select which display content to display. Further, using the scoring system selects display content more efficiently and provides more relevant display content to a user thereby improving user interface 112.

System Overview

Figure 8:
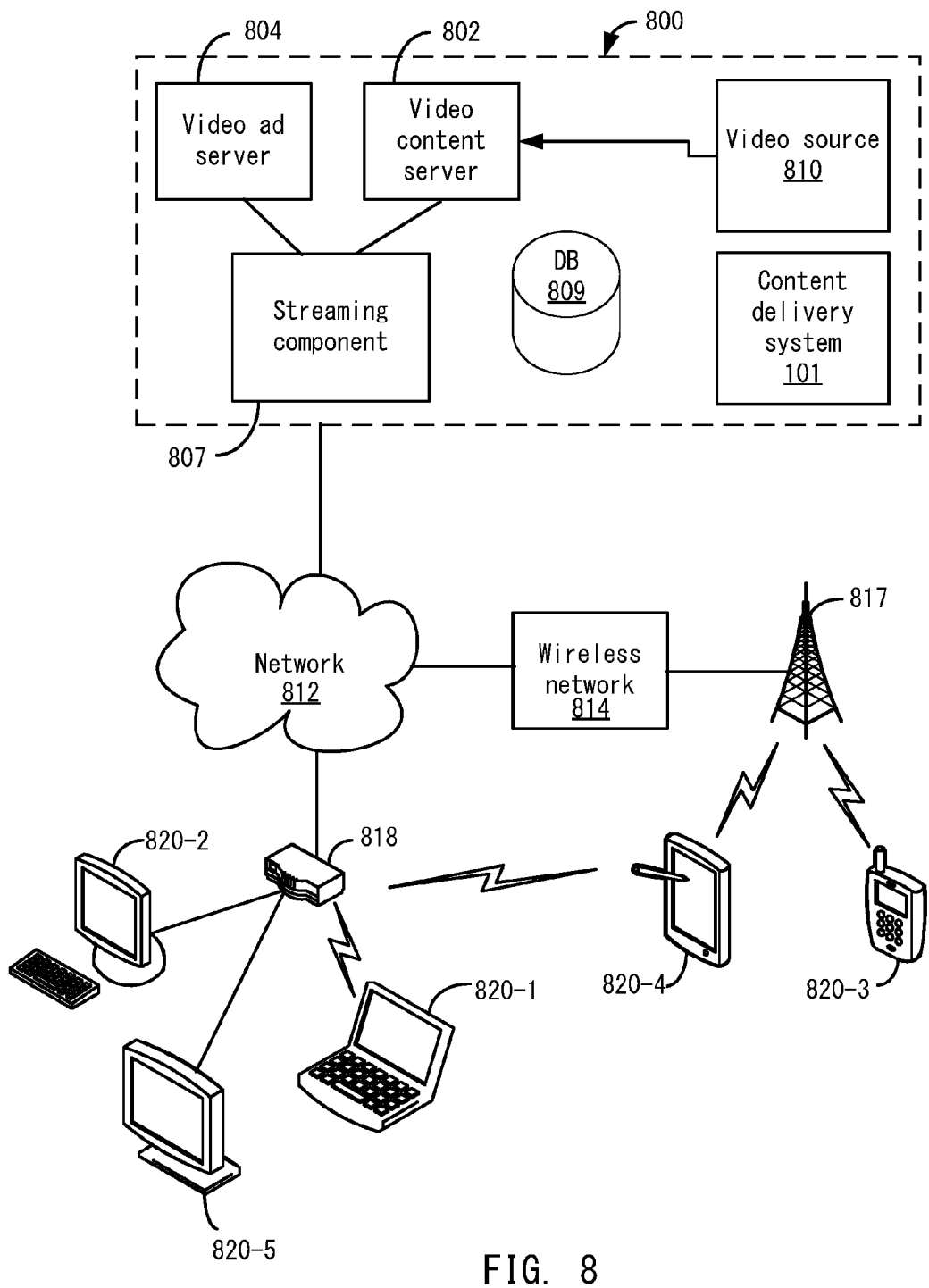
FIG. 8 depicts a video streaming system in communication with multiple client devices via one or more communication networks according to one embodiment.

Features and aspects as disclosed herein may be implemented in conjunction with a video streaming system 800 in communication with multiple client devices via one or more communication networks as shown in FIG. 8. Aspects of the video streaming system 800 are described merely to provide an example of an application for enabling distribution and delivery of content prepared according to the present disclosure. It should be appreciated that the present technology is not limited to streaming video applications, and may be adapted for other applications and delivery mechanisms.

In one embodiment, a media program provider may include a library of media programs. For example, the media programs may be aggregated and provided through a site (e.g., Website), application, or browser. A user can access the media program provider's site or application and request media programs. The user may be limited to requesting only media programs offered by the media program provider.

In system 800, video data may be obtained from one or more sources for example, from a video source 810, for use as input to a video content server 802. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner and/or transcoder. The input video data may comprise video clips or programs of various types, for example, television episodes, motion pictures, and other content produced as primary content of interest to consumers. The video data may also include audio or only audio may be used.

The video streaming system 800 may include one or more computer servers or modules 802, 804, and/or 807 distributed over one or more computers. Each server 802, 804, 807 may include, or may be operatively coupled to, one or more data stores 809, for example databases, indexes, files, or other data structures. A video content server 802 may access a data store (not shown) of various video segments. The video content server 802 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 804 may access a data store of relatively short videos (e.g., 10 second, 30 second, or 60 second video advertisements) configured as advertising for a particular advertiser or message. The advertising may be provided for an advertiser in exchange for payment of some kind, or may comprise a promotional message for the system 800, a public service message, or some other information. The video advertising server 804 may serve the video advertising segments as directed by a user interface controller (not shown).

The video streaming system 800 also may include content delivery system 101.

The video streaming system 800 may further include an integration and streaming component 807 that integrates video content and video advertising into a streaming video segment. For example, streaming component 807 may be a content server or streaming media server. A controller (not shown) may determine the selection or configuration of advertising in the streaming video based on any suitable algorithm or process. The video streaming system 800 may include other modules or units not depicted in FIG. 8, for example administrative servers, commerce servers, network infrastructure, advertising selection engines, and so forth.

The video streaming system 800 may connect to a data communication network 812. A data communication network 812 may comprise a local area network (LAN), a wide area network (WAN), for example, the Internet, a telephone network, a wireless cellular telecommunications network (WCS) 814, or some combination of these or similar networks.

One or more client devices 820 may be in communication with the video streaming system 800, via the data communication network 812 and/or other network 814. Such client devices may include, for example, one or more laptop computers 820-1, desktop computers 820-2, "smart" mobile phones 820-3, tablet devices 820-4, network-enabled televisions 820-5, or combinations thereof, via a router 818 for a LAN, via a base station 818 for a wireless telephony network 814, or via some other connection. In operation, such client devices 820 may send and receive data or instructions to the system 800, in response to user input received from user input devices or other input. In response, the system 800 may serve video segments and metadata from the data store 809 responsive to selection of media programs to the client devices 820. Client devices 820 may output the video content from the streaming video segment in a media player using a display screen, projector, or other video output device, and receive user input for interacting with the video content.

Distribution of audio-video data may be implemented from streaming component 807 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidths and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player on the destination client. Streaming component 807 may communicate with client device 820 using control messages and data messages to adjust to changing network conditions as the video is played. These control messages can include commands for enabling control functions such as fast forward, fast reverse, pausing, or seeking to a particular part of the file at the client.

Since streaming component 807 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming component 807 may use TCP-based protocols, such as HTTP and Real Time Messaging Protocol (RTMP). Streaming component 807 can also deliver live webcasts and can multicast, which allows more than one client to tune into a single stream, thus saving bandwidth. Streaming media players may not rely on buffering the whole video to provide random access to any point in the media program. Instead, this is accomplished through the use of control messages transmitted from the media player to the streaming media server. Another protocol used for streaming is hypertext transfer protocol (HTTP) live streaming (HLS) or Dynamic Adaptive Streaming over HTTP (DASH). The HLS or DASH protocol delivers video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and also infrastructure failures that may occur during playback of the video.

The delivery of video content by streaming may be accomplished under a variety of models. In one model, the user pays for the viewing of video programs, for example, using a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 9:
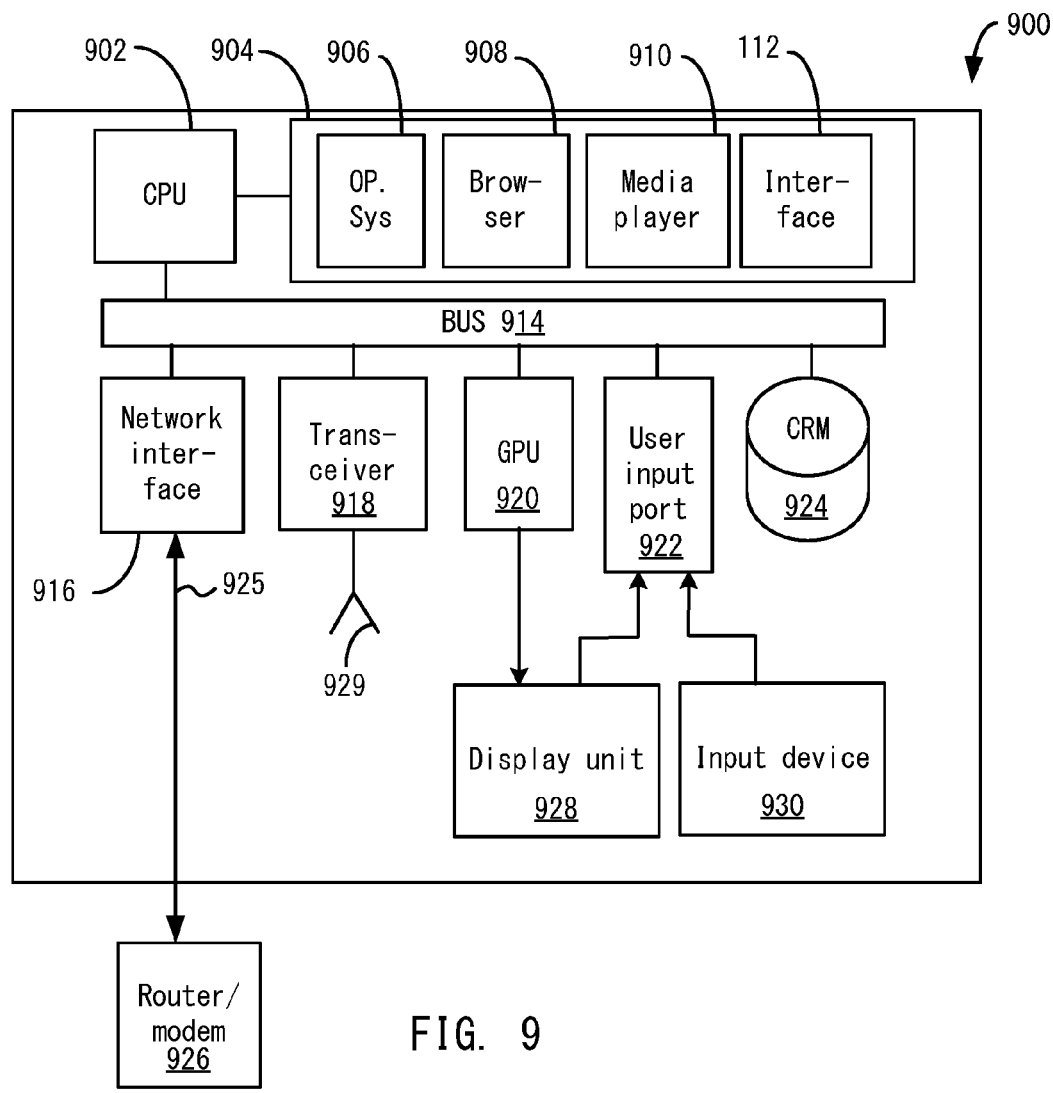
FIG. 9 depicts a diagrammatic view of an apparatus for viewing video content and advertisements.

Referring to FIG. 9, a diagrammatic view of an apparatus 900 for viewing video content and advertisements is illustrated. In selected embodiments, the apparatus 900 may include a processor (CPU) 902 operatively coupled to a processor memory 904, which holds binary-coded functional modules for execution by the processor 902. Such functional modules may include an operating system 906 for handling system functions such as input/output and memory access, a browser 908 to display web pages, and media player 910 for playing video. The modules may further include interface 112. The memory 904 may hold additional modules not shown in FIG. 9, for example modules for performing other operations described elsewhere herein.

A bus 914 or other communication component may support communication of information within the apparatus 900. The processor 902 may be a specialized or dedicated microprocessor configured to perform particular tasks in accordance with the features and aspects disclosed herein by executing machine-readable software code defining the particular tasks. Processor memory 904 (e.g., random access memory (RAM) or other dynamic storage device) may be connected to the bus 914 or directly to the processor 902, and store information and instructions to be executed by a processor 902. The memory 904 may also store temporary variables or other intermediate information during execution of such instructions.

A computer-readable medium in a storage device 924 may be connected to the bus 914 and store static information and instructions for the processor 902; for example, the storage device (CRM) 924 may store the modules 906, 908, and 910 when the apparatus 900 is powered off, from which the modules may be loaded into the processor memory 904 when the apparatus 900 is powered up. The storage device 924 may include a non-transitory computer-readable storage medium holding information, instructions, or some combination thereof, for example instructions that when executed by the processor 902, cause the apparatus 900 to be configured to perform one or more operations of a method as described herein.

A communication interface 916 may also be connected to the bus 914. The communication interface 916 may provide or support two-way data communication between the apparatus 900 and one or more external devices, e.g., the streaming system 700, optionally via a router/modem 926 and a wired or wireless connection. In the alternative, or in addition, the apparatus 900 may include a transceiver 918 connected to an antenna 929, through which the apparatus 900 may communicate wirelessly with a base station for a wireless communication system or with the router/modem 926. In the alternative, the apparatus 900 may communicate with a video streaming system 800 via a local area network, virtual private network, or other network. In another alternative, the apparatus 900 may be incorporated as a module or component of the system 800 and communicate with other components via the bus 914 or by some other modality.

The apparatus 900 may be connected (e.g., via the bus 914 and graphics processing unit 920) to a display unit 928. A display 928 may include any suitable configuration for displaying information to an operator of the apparatus 900. For example, a display 928 may include or utilize a liquid crystal display (LCD), touchscreen LCD (e.g., capacitive display), light emitting diode (LED) display, projector, or other display device to present information to a user of the apparatus 900 in a visual display.

One or more input devices 930 (e.g., an alphanumeric keyboard, microphone, keypad, remote controller, game controller, camera or camera array) may be connected to the bus 914 via a user input port 922 to communicate information and commands to the apparatus 900. In selected embodiments, an input device 930 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 928, for example using a touch sensitive screen. A cursor control device may communicate direction information and command selections to the processor 902 and control cursor movement on the display 928. A cursor control device may have two or more degrees of freedom, for example allowing the device to specify cursor positions in a plane or three-dimensional space.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:
receiving, by a computing device, a request from a user for a view in an application for a video delivery service;
receiving, by the computing device, a set of advertisement (ad) campaign content along with an ad campaign score for each ad campaign content, wherein the ad campaign score is generated by a first engine using a first process to select the ad campaign content and generate the ad campaign scores;
receiving, by the computing device, a set of media program campaign content that promotes media programs along with a media program campaign score for each media program campaign content, wherein the media program campaigns are generated by a second engine using a second process to select the media program campaigns and generate the media program campaign scores;
receiving, by the computing device, relevance scores for the set of ad campaign content and the set of media program campaign content from a recommendation engine, wherein the recommendation engine provides relevance scores for the set of ad campaign content and the set of media program campaign content using user information for the user based on user behavior on the video delivery service;
generating, by the computing device, combinations of ad campaign content and media program campaign content;
generating, by the computing device, a database table that combines at least a portion of the ad campaign scores, media program campaign scores, and relevance scores using a process to generate total scores for the set of ad campaign content that will be shown over the set of media program campaign content, wherein total scores for the combinations of ad campaign content and the media programs content combine the ad campaign score, the media program campaign score, and relevance score for each respective combination;
selecting, by the computing device, one or more of the set of ad campaign content and the set of media program campaign content based on the total scores in the database table; and
in response to receiving the request for the view, causing, by the computing device, display of the one or more of the set of ad campaign content that are shown over the set of media program campaigns on the view for the user, wherein the combinations of ad campaign content and the media program campaign content include the ad campaign content shown over the media program campaign content in a same area of the view.

2. The method of claim 1, wherein:
the ad campaign scores are generated using a first range of values,
the media program campaign scores are generated using a second range of values, and
the relevance scores are generated using a third range of values.

3. The method of claim 2, wherein:
the first range of values has a first top value that is higher than a second top value for the second range of values.

4. The method of claim 3, wherein the third range of values have a third top value that is lower than the first top value and the second top value.

5. The method of claim 1, wherein the first engine generates ad campaign scores by performing:
generating an ad campaign score based on an importance of receiving an impression for ad campaign content for the video delivery service.

6. The method of claim 5, wherein the ad campaign score is based on an hourly rate of impression delivery that is necessary to reach a total impression goal for the ad campaign content, a rate at which the ad campaign content is qualifying for impressions, and historical traffic for the video delivery service over a period of time.

7. The method of claim 1, wherein the second engine generates media program campaign scores by performing:
generating a media program campaign score based on an importance of receiving an impression for media program campaign content for the video delivery service.

8. The method of claim 7, wherein the media program campaign score is based on an expected number of impressions for the media program campaign, a total impression goal for the media program campaign, and a time period for the media program campaign.

9. The method of claim 8, wherein the media program campaign score is from a negative number to a positive number, wherein the negative number indicates receiving the impression is less important and a positive number indicates receiving the impression is more important.

10. The method of claim 1, wherein the recommendation engine generates the relevance scores by performing:
generating a relevance score based on user behavior on the video delivery service for media program campaign content or ad campaign content.

11. The method of claim 10, wherein the user behavior is used to calculate a probability the user will interact with the media program campaign content or the ad campaign content.

12. The method of claim 1, further comprising:
receiving recommendation content from the recommendation engine, the recommendation content being different from the media program campaign content and the ad campaign content;
adding the recommendation content to the database table with total scores for the recommendation content; and
selecting one or more of the set of ad campaign content, the recommendation content, and the set of media program campaign content based on the total scores in the database table.

13. The method of claim 1, wherein generating the database table comprises:
summing the ad campaign score, the media program campaign score, and the relevance score for each of the media program campaign content or an ad campaign content.

14. The method of claim 1, wherein:
an instance of ad campaign content is associated with one or more media programs, and
an instance of media program campaign content promotes a media program.

15. The method of claim 1, wherein:
an instance of ad campaign content is a logo that specifies one or more media programs in which the logo can be displayed with, and
an instance of media program campaign content promotes a media program.

16. The method of claim 1, wherein selecting the one or more of the set of ad campaign content and the set of media program campaign content based on the total scores comprises:
selecting a first one of the set of ad campaign content and the set of media program campaign content with a highest total score;
reducing at least one of the ad campaign score, media program campaign score, and relevance score for a second one of the set of ad campaign content and the set of media program campaign content that is related to the first one of the set of ad campaign content and the set of media program campaign content; and
selecting a third one of the set of ad campaign content and the set of media program campaign content with the highest remaining total score.

17. A non-transitory computer-readable storage medium containing instructions, that when executed, control a computer system to be configured for:
receiving a request from a user for a view in an application for a video delivery service;
receiving a set of advertisement (ad) campaign content along with an ad campaign score for each ad campaign content, wherein the ad campaign score is generated by a first engine using a first process to select the ad campaign content and generate the ad campaign scores;
receiving a set of media program campaign content that promotes media programs along with a media program campaign score for each media program campaign content, wherein the media program campaigns are generated by a second engine using a second process to select the media program campaigns and generate the media program campaign scores;
receiving relevance scores for the set of ad campaign content and the set of media program campaign content from a recommendation engine, wherein the recommendation engine provides relevance scores for the set of ad campaign content and the set of media program campaign content using user information for the user based on user behavior on the video delivery service;
generating combinations of ad campaign content and media program campaign content;
generating a database table that combines at least a portion of the ad campaign scores, media program campaign scores, and relevance scores using a process to generate total scores for the set of ad campaign content that will be shown over the set of media program campaign content, wherein total scores for the combinations of ad campaign content and the media programs content combine the ad campaign score, the media program campaign score, and relevance score for each respective combination;

selecting one or more of the set of ad campaign content and the set of media program campaign content based on the total scores in the database table; and in response to receiving the request for the view, causing display of the one or more of the set of ad campaign content that are shown over the set of media program campaigns on the view for the user, wherein the combinations of ad campaign content and the media program campaign content include the ad campaign content shown over the media program campaign content in a same area of the view.

18. The non-transitory computer-readable storage medium of claim 17, wherein the first engine generates ad campaign scores by performing:

generating an ad campaign score based on an importance of receiving an impression for ad campaign content for the video delivery service.

19. The non-transitory computer-readable storage medium of claim 17, wherein the second engine generates media program campaign scores by performing:

generating a media program campaign score based on an importance of receiving an impression for media program campaign content for the video delivery service.

20. The non-transitory computer-readable storage medium of claim 17, wherein the recommendation engine generates the relevance scores by performing:

generating a relevance score based on user behavior on the video delivery service for media program campaign content or ad campaign content.

21. An apparatus comprising:

one or more computer processors; and a non-transitory computer-readable storage medium comprising instructions, that when executed, control the one or more computer processors to be configured for:

receiving a request from a user for a view in an application for a video delivery service;

receiving a set of advertisement (ad) campaign content along with an ad campaign score for each ad campaign content, wherein the ad campaign score is generated by a first engine using a first process to select the ad campaign content and generate the ad campaign scores;

receiving a set of media program campaign content that promotes media programs along with a media program campaign score for each media program campaign content, wherein the media program campaigns are generated by a second engine using a second process to select the media program campaigns and generate the media program campaign scores;

receiving relevance scores for the set of ad campaign content and the set of media program campaign content from a recommendation engine, wherein the recommendation engine provides relevance scores for the set of ad campaign content and the set of media program campaign content using user information for the user based on user behavior on the video delivery service;

generating combinations of ad campaign content and media program campaign content;

generating a database table that combines at least a portion of the ad campaign scores, media program campaign scores, and relevance scores using a process to generate total scores for the set of ad campaign content that will be shown over the set of media program campaign content, wherein total scores for the combinations of ad campaign content and the media programs content combine the ad campaign score, the media program campaign score, and relevance score for each respective combination;

selecting one or more of the set of ad campaign content and the set of media program campaign content based on the total scores in the database table; and in response to receiving the request for the view, causing display of the one or more of the set of ad campaign content that are shown over the set of media program campaigns on the view for the user, wherein the combinations of ad campaign content and the media program campaign content include the ad campaign content shown over the media program campaign content in a same area of the view.

* * * * *